(12) United States Patent
Jiang et al.

(10) Patent No.: US 11,196,753 B2
(45) Date of Patent: *Dec. 7, 2021

(54) SELECTING USER IDENTITY VERIFICATION METHODS BASED ON VERIFICATION RESULTS

(71) Applicant: Advanced New Technologies Co., Ltd., George Town (KY)

(72) Inventors: Jian Jiang, Hangzhou (CN); Xin Lei, Hangzhou (CN); Hongfa Sun, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,337

(22) Filed: Dec. 19, 2019

(65) Prior Publication Data

US 2020/0128021 A1 Apr. 23, 2020

Related U.S. Application Data

(63) Continuation of application No. 16/009,424, filed on Jun. 15, 2018, now Pat. No. 10,686,801, which is a
(Continued)

(30) Foreign Application Priority Data

Dec. 16, 2015 (CN) .......................... 201510946529.7

(51) Int. Cl.
*H04L 29/06* (2006.01)
*H04L 9/32* (2006.01)
*G06F 21/31* (2013.01)

(52) U.S. Cl.
CPC ............ *H04L 63/108* (2013.01); *G06F 21/31* (2013.01); *H04L 9/32* (2013.01); *H04L 63/083* (2013.01); *H04L 63/0861* (2013.01)

(58) Field of Classification Search
CPC ....... H04L 63/108; H04L 9/32; H04L 63/083; H04L 63/0861; G06F 21/31; G06F 17/3047; G06K 9/00523
See application file for complete search history.

(56) References Cited

U.S. PATENT DOCUMENTS 10,762,262 B1 * 9/2020 Moon ..................... G06F 30/33
2005/0228675 A1 * 10/2005 Trinkel .................. G06Q 20/40
704/270
(Continued)

FOREIGN PATENT DOCUMENTS

| CN | 1708773 | 12/2005 |
|---|---|---|
| CN | 101087193 | 12/2007 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Abu S Sholeman
(74) *Attorney, Agent, or Firm* — Fish & Richardson P.C.

(57) ABSTRACT

Implementations of the present disclosure discloses user identity verification method selection method and device. In an implementation, times and corresponding verification methods of successful user identity verifications are recorded, one or more verification methods of successful user identity verifications performed in a predetermined time period based on the recorded times and corresponding verification methods are identified. Whether at least one verification method is included in both the identified one or more verification methods of successful user identity verifications and a list of available verification methods are determined. One or more available verification methods different from the identified one or more verification meth-
(Continued)

ods are used for user identity verification if no verification method is included in both the identified one or more verification methods of successful user identity verifications and the list of available verification methods.

19 Claims, 9 Drawing Sheets

Related U.S. Application Data continuation of application No. PCT/CN2016/108633, filed on Dec. 6, 2016.

(56) References Cited

U.S. PATENT DOCUMENTS

| | | | |
|---|---|---|---|
| 2007/0136582 A1 | 6/2007 | Longobardi et al. | |
| 2008/0001703 A1* | 1/2008 | Goto | H04M 1/0243 340/5.8 |
| 2008/0317294 A1* | 12/2008 | Hashimoto | G07C 9/37 382/115 |
| 2010/0064346 A1 | 3/2010 | Falk et al. | |
| 2010/0146606 A1* | 6/2010 | Delia | G06F 21/32 726/7 |
| 2011/0017608 A1* | 1/2011 | Taylor | C25F 3/14 205/666 |
| 2011/0047608 A1* | 2/2011 | Levenberg | H04L 63/0807 726/7 |
| 2011/0162051 A1 | 6/2011 | Li et al. | |
| 2011/0206269 A1* | 8/2011 | Tyler | G06K 9/036 382/141 |
| 2012/0170724 A1* | 7/2012 | Yoakum | G06Q 10/107 379/88.22 |
| 2012/0311703 A1 | 12/2012 | Yanovsky et al. | |
| 2013/0104187 A1 | 4/2013 | Weidner | |
| 2013/0269016 A1 | 10/2013 | Li et al. | |
| 2014/0123275 A1 | 5/2014 | Azar et al. | |
| 2014/0233855 A1* | 8/2014 | Clarke | G06F 16/2455 382/190 |
| 2015/0067697 A1* | 3/2015 | Iizuka | G06F 9/52 718/106 |
| 2015/0074796 A1* | 3/2015 | Meir | H04W 12/0608 726/19 |
| 2015/0121467 A1 | 4/2015 | Yun et al. | |
| 2015/0172280 A1* | 6/2015 | Song | G06F 21/31 726/6 |
| 2015/0186628 A1* | 7/2015 | Bush | G06F 21/31 726/19 |
| 2015/0319173 A1 | 11/2015 | Hu et al. | |
| 2015/0324579 A1 | 11/2015 | Qian et al. | |
| 2016/0065568 A1* | 3/2016 | Dave | H04L 63/0853 726/4 |
| 2016/0373437 A1* | 12/2016 | He | H04L 63/0861 |
| 2018/0309767 A1 | 10/2018 | Jiang et al. | |

FOREIGN PATENT DOCUMENTS

| | | |
|---|---|---|
| CN | 101090575 | 12/2007 |
| CN | 101686126 | 3/2010 |
| CN | 102684882 | 9/2012 |
| CN | 102685106 | 9/2012 |
| EP | 1914961 | 4/2008 |
| JP | 2007272600 | 10/2007 |
| JP | 2012212368 | 11/2012 |
| JP | 2014164578 | 9/2014 |
| JP | 2014215853 | 11/2014 |
| KR | 20070016534 | 2/2007 |
| KR | 20070119495 | 12/2007 |
| WO | WO 2009075180 | 6/2009 |

OTHER PUBLICATIONS

Extended European Search Report issued in EP Application No. 16874761.6 dated Aug. 6, 2018; 7 pages.
International Search Report by the International Searching Authority issued in International Application No. PCT/CN2016/108633 dated Mar. 2, 2017; 8 pages.
Nakamoto, "Bitcoin: A Peer-to-Peer Electronic Cash System," www.bitcoin.org, 2005, 9 pages.
PCT International Preliminary Report on Patentability in International Application No. PCT/CN2016/108633, dated Jun. 19, 2018, 9 page (with English translation).

* cited by examiner

SELECTING USER IDENTITY VERIFICATION METHODS BASED ON VERIFICATION RESULTS

This application is a continuation of U.S. patent application Ser. No. 16/009,424, filed on Jun. 15, 2018, which is a continuation of PCT Application No. PCT/CN2016/108633, filed on Dec. 6, 2016, which claims priority to Chinese Patent Application No. 201510946529.7, filed on Dec. 16, 2015, and each application is hereby incorporated by reference in its entirety.

TECHNICAL FIELD

The present disclosure relates to the field of Internet technologies, and in particular, to a verification method and device.

BACKGROUND

Currently, to protect properties of a user against damage, when the user performs a sensitive operation that is related to property security of the user, such as changing an account password, online shopping, or online transfer, a server will verify the user's identity to ensure that the operation is performed by the user. As such, the user can successfully achieve the purpose of changing the account password, online shopping, online transfer, etc. Among them, the commonly used verification method is text message-based verification.

Sometimes, a user may perform multiple sensitive operations related to property security of the user in a short period of time. Because a server verifies a user's identity via text message-based verification, each time the user performs a sensitive operation, the server will verify the user's identity multiple times via text message-based verification in the entire process. For example, the user first changes an account password, and immediately performs network payment after the changes were completed. When the user changes the account password, the server verifies the user's identity via text message-based verification. When the user performs network payment, the server will verify the user's identity again via text message-based verification.

SUMMARY

To resolve the problem in the existing technology, the present disclosure provides a verification method and device.

A first aspect of the embodiments of the present disclosure provides a verification method, where the method includes: when verification needs to be performed on a user, obtaining a current local time; obtaining a verification method in which the user failed to pass verification in predetermined duration prior to the current time; and performing verification on the user by using the verification method in which the user failed to pass verification.

The obtaining of a verification method in which the user failed to pass verification in predetermined duration prior to the current time includes: obtaining a verification method list, where each row in the verification method list includes at least one verification method; removing, from the verification method list, a verification method in which the user is verified in the predetermined duration prior to the current time; and obtaining a verification method in one row in a post-removal verification method list.

The removing, from the verification method list, a verification method in which the user is verified in the predetermined duration prior to the current time includes: obtaining a locally stored correspondence between a verification method and a passing time; searching the correspondence for a verification method corresponding to the passing time, where a difference between the passing time and the current time is smaller than the predetermined duration; and deleting the identified verification method from the verification method list.

The method further includes: when the user is verified in the verification method in which the user is previously unverified, obtaining a current local time and determining the current local time as a passing time when the user is verified in the verification method in which the user is previously unverified; and substituting, in the correspondence, the determined passing time for a passing time corresponding to the verification method in which the user is previously unverified.

After the removing, from the verification method list, a verification method in which the user is verified in the predetermined duration prior to the current time, the method further includes: determining whether the number of rows in the post-removal verification method list is smaller than the number of rows in the pre-removal verification method list; and when the number of rows in the post-removal verification method list is smaller than the number of rows in the pre-removal verification method list, determining that the user is currently verified; or when the number of rows in the post-removal verification method list is equal to the number of rows in the pre-removal verification method list, performing the step of obtaining a verification method in one row in a post-removal verification method list.

A second aspect of the embodiments of the present disclosure provides a verification method, where the method includes: when verification needs to be performed on a user, obtaining a current local time; obtaining a verification method that has not been used to perform verification on the user in predetermined duration prior to the current time; and performing verification on the user by using the unused verification method.

The obtaining of a verification method that has not been used to perform verification on the user in predetermined duration prior to the current time includes: obtaining a verification method list, where each row in the verification method list includes at least one verification method; removing, from the verification method list, a verification method that has been used to perform verification on the user in the predetermined duration prior to the current time; and obtaining a verification method in one row in a post-removal verification method list.

The removing, from the verification method list, a verification method that has been used to perform verification on the user in the predetermined duration prior to the current time includes: obtaining a locally stored correspondence between a verification method and a verification time; searching the correspondence for a verification method corresponding to a verification time, where a difference between the verification time and the current time is smaller than the predetermined duration; and deleting the identified verification method from the verification method list.

The method further includes: when verification is performed on the user by using the unused verification method, obtaining a current local time and determining the current local time as a verification time of performing verification on the user by using the unused verification method; and substituting, in the correspondence, the determined verification time for a verification time corresponding to the unused verification method.

After the removing, from the verification method list, a verification method that has been used to perform verification on the user in the predetermined duration prior to the current time, the method further includes: determining whether the number of rows in the post-removal verification method list is smaller than the number of rows in the pre-removal verification method list; and when the number of rows in the post-removal verification method list is smaller than the number of rows in the pre-removal verification method list, determining that the user is currently verified; or when the number of rows in the post-removal verification method list is equal to the number of rows in the pre-removal verification method list, performing the step of obtaining a verification method in one row in a post-removal verification method list.

A third aspect of the embodiments of the present disclosure provides a verification device, where the device includes: a first current time acquisition module, configured to obtain a current local time when verification needs to be performed on a user; a first verification method acquisition module, configured to obtain a verification method in which the user failed to pass verification in predetermined duration prior to the current time; and a first verification module, configured to perform verification on the user by using the verification method in which the user failed to pass verification.

A fourth aspect of the embodiments of the present disclosure provides a verification device, where the device includes: a second current time acquisition module, configured to: when verification needs to be performed on a user, obtain a current local time; a second verification method acquisition module, configured to obtain a verification method that has not been used to perform verification on the user in predetermined duration prior to the current time; and a second verification module, configured to perform verification on the user by using the unused verification method.

The technical solutions provided in the embodiments of the present disclosure can include the following beneficial effects: In the existing technology, a server verifies a user's identity via text message-based verification each time the user performs a sensitive operation. If the user performs multiple sensitive operations in a short period of time, the server will verify the user's identity multiple times by using the same verification method in a short period of time, resulting in relatively low user experience.

In the embodiments of the present disclosure, when verification needs to be performed on a user, a verification method in which the user failed to pass verification in predetermined duration prior to a current time is obtained; or a verification method that has not been used to perform verification on the user in predetermined duration prior to a current time is obtained. Then verify the user by the obtained verification method, avoiding using the same verification method to verify the user multiple times in a short period of time, and improving user experience.

It should be understood that both the foregoing general descriptions and the following detailed descriptions are merely explanatory examples, and cannot limit the present disclosure.

BRIEF DESCRIPTION OF DRAWINGS

The accompanying drawings here are incorporated in the specification, become a part of the specification, show embodiments that are in accordance with the present disclosure, and are used with the specification to explain the principle of the present disclosure.

DESCRIPTION OF EMBODIMENTS

Exemplary embodiments are described in detail here, and examples of the exemplary embodiments are presented in the accompanying drawings. When the following description refers to the accompanying drawings, unless otherwise indicated, same numerals in different accompanying drawings represent the same or similar element. Implementations described in the following exemplary embodiments do not represent all implementations consistent with the present disclosure. On the contrary, they are only examples of apparatus and methods consistent with some aspects of the present disclosure as detailed in the appended claims.

Figure 1:
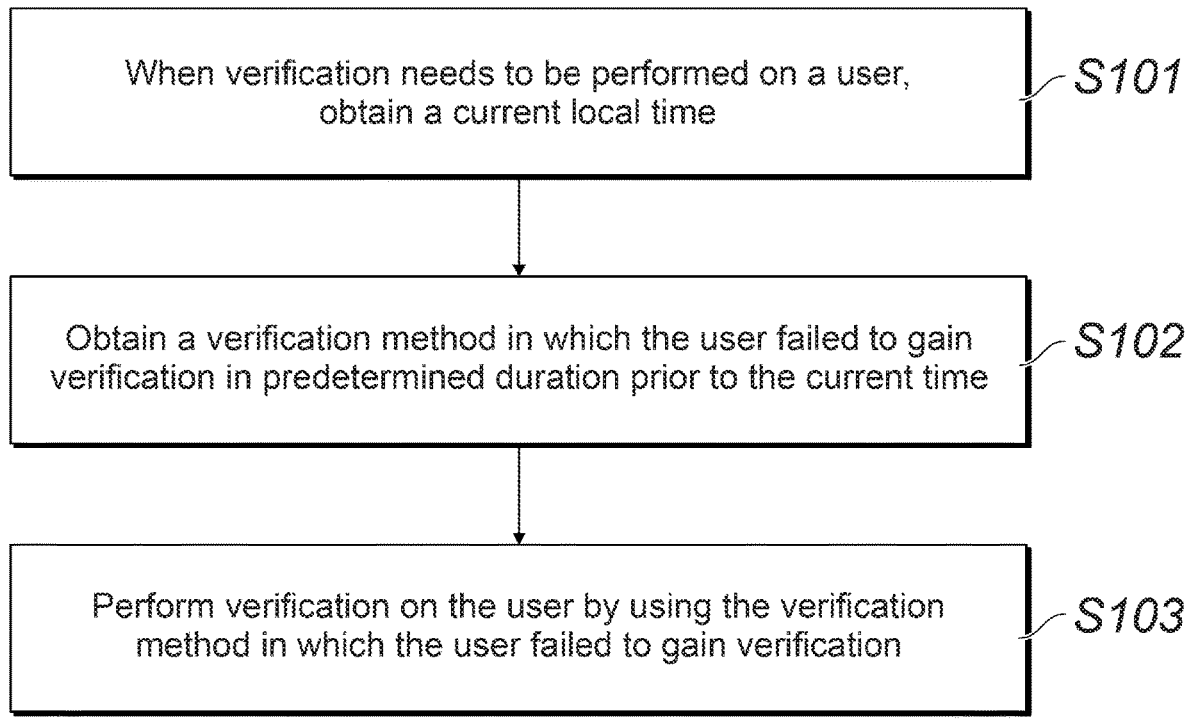
FIG. 1 is a flowchart illustrating a verification method according to an exemplary embodiment.

FIG. 1 is a flowchart illustrating a verification method according to an exemplary embodiment. As shown in FIG. 1, the method includes the following steps.

In step S101, obtain a current local time when user verification needs to be performed.

In the process of using the terminal, the user sometimes needs to perform a sensitive operation that is related to property security of the user on the terminal, for example, changing an account password, online shopping, or online transfer. When the terminal receives a user's input that is a sensitive operation closely relating to property security of the user, it generates a sensitive request and sends the sensitive request to a server. When the server receives the sensitive request sent by the terminal, to ensure property security of the user, the server needs to perform verification on the identity of the user before responding to the sensitive request, to ensure that the sensitive operation is performed by the user. When the user is verified, the server responds to the sensitive request.

For the server, when receiving the sensitive request sent by the terminal, it determines to perform verification on the user and obtains the current local time.

In step S102, identify a failed user verification method used by the user in a predetermined time period before the current time.

The predetermined duration can be a duration that is set by a technician on the server in advance, and can be 30 seconds, 1 minute, or 2 minutes, and the like. This is not limited in the present disclosure.

Among them, there are many verification methods for the server to verify the user. For example, text message-based verification, email-based verification, facial verification, security question verification, fingerprint verification, etc.

For example, suppose the predetermined duration is 10 minutes. Within 10 minutes prior to the current time, if the server performs verification on the identity of the user via text message-based verification, and the user is verified, the text message-based verification is a verification method in which the user is verified in the predetermined duration prior to the current time. Within 10 minutes prior to the current time, if the server performs verification on the identity of the user via email-based verification, but the user failed to pass verification, the email-based verification is a verification method that the user failed to pass verification in the predetermined duration prior to the current time.

In step S103, perform user verification using the failed user verification method.

In the existing technology, a server performs verification on an identity of a user via text message-based verification each time the user performs a sensitive operation. If the user performs multiple sensitive operations in a short period of time, and the server performs verification on the user multiple times by using the same failed verification method in a short period of time, the user experience can be compromised.

In this embodiment of the present disclosure, when verification needs to be performed on a user, a verification method that the user failed to pass verification in a predetermined time period before the current time is identified. User verification is then performed by using the identified verification method. Therefore, using the same verification method to verify the user multiple times in a short period of time is avoided, and user experience is improved.

Figure 2:
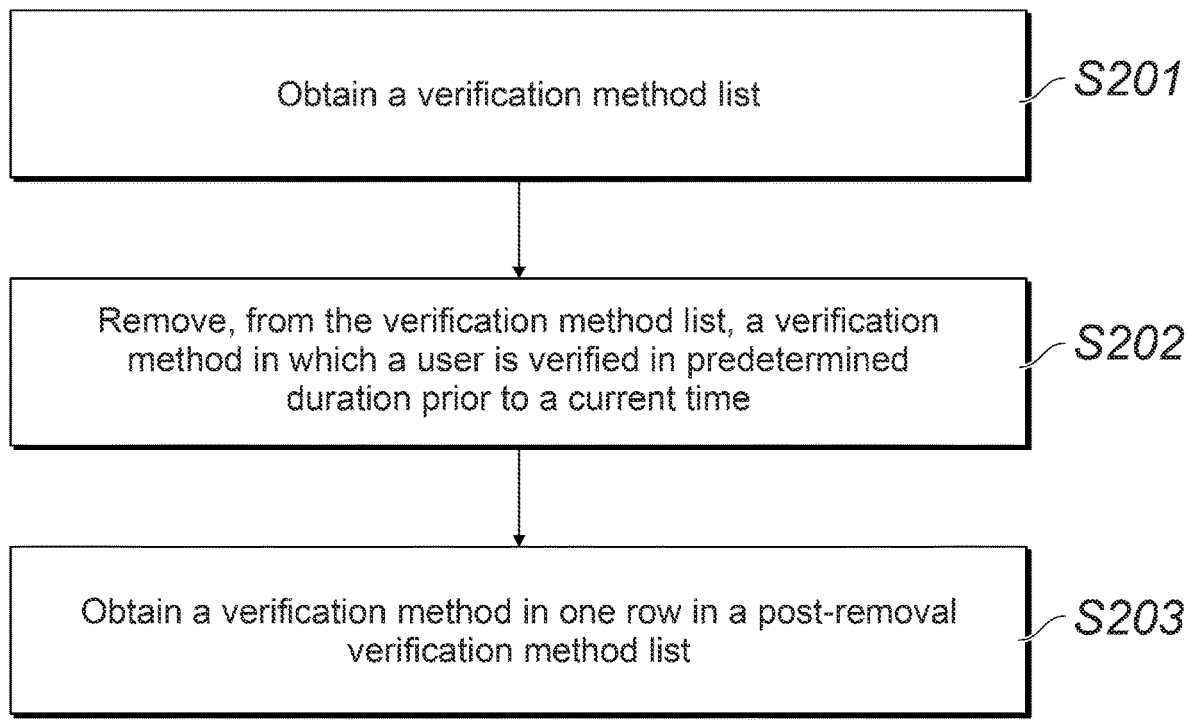
FIG. 2 is a flowchart illustrating a verification method according to an exemplary embodiment.

In another embodiment of the present disclosure, as shown in FIG. 2, step S102 includes the following steps.

In step S201, a verification method list is obtained.

The verification method list can include multiple rows. Each row includes at least one verification method. Verification methods included in different rows are not completely the same. If a row includes multiple verification methods, any two verification methods in the row are different.

For example, the verification method list can be shown in Table 1. There are three rows in Table 1. The first row includes two verification methods: text message-based verification and email-based verification. The second row includes one verification method: facial verification. The third row includes two verification methods: email-based verification and security question verification.

TABLE 1

Text message-based verification and email-based verification
Facial verification
Email-based verification and security question verification In step S202, a verification method in which the user is verified in the predetermined duration prior to the current time is removed from the verification method list.

The present step can be specifically implemented in the following processes, including:

(11) Obtain a locally stored correspondence between a verification method and a passing time.

In this embodiment of the present disclosure, each time the server performs verification on the user by using a certain verification method. If the user passes the verification method, the server obtains a passing time indicating the time the user is verified by the verification method, and then searches the locally stored correspondence between a verification method and a passing time to determine whether the verification method exists.

When the correspondence does not include the verification method, it indicates that the user is previously unverified by the verification method. In this case, the verification method and the passing time are stored as one record in the correspondence.

When the correspondence includes the verification method, it indicates that the user is previously verified by the verification method. In this case, the correspondence needs to be searched for a passing time corresponding to the verification method, and then the obtained passing time is substituted for the identified passing time, so that the passing time indicating the time the user is verified by the verification method can be updated.

As such, when a latest passing time when the user is previously verified by a certain verification method needs to be searched for, the server can obtain the locally stored correspondence between a verification method and a passing time, and then search the correspondence for a passing time corresponding to the verification method, so as to obtain the latest passing time when the user is previously verified by the verification method.

For example, the correspondence between a verification method and a passing time can be shown in Table 2.

TABLE 2

| Verification method | Passing time |
| --- | --- |
| Email-based verification | 09:09:22 |
| Text message-based verification | 13:05:27 |
| Facial verification | 12:08:12 |
| Security question verification | 11:32:45 |
| Fingerprint verification | 13:01:21 |

As shown in Table 2, previously, verification methods by which the user is verified include email-based verification, text message-based verification, facial verification, security question verification, and fingerprint verification. The latest passing time when the user is verified via email-based verification is 09:09:22, the latest passing time when the user is verified via text message-based verification is 13:05:27, the latest passing time when the user is verified via facial verification is 12:08:12, the latest passing time when the user is verified via security question verification is 11:32:45, and the latest passing time when the user is verified via fingerprint verification is 13:01:21.

(12) Search the correspondence for a verification method corresponding to a passing time, where a difference between the passing time and the current time is smaller than the predetermined duration.

A passing time included in any record in the correspondence is obtained. The passing time is subtracted from the current time to obtain duration. The duration is compared with the predetermined duration. If the duration is smaller than the predetermined duration, a verification method included in the record is obtained and is used as a verification method corresponding to a passing time, where a difference between the passing time and the current time is smaller than the predetermined duration.

The described operation is performed on any other record in the correspondence. As such, all verification methods corresponding to passing times are identified from the correspondence, where a difference between the passing time and the current time is smaller than the predetermined duration.

For example, the current time is 13:10:04, and the predetermined duration is 10 minutes. Passing times 13:05:27 and 13:01:21 can be identified from the correspondence shown in Table 2, where a difference between the passing time and the current time 13:10:04 is smaller than 10 minutes, and it can be determined that verification methods corresponding to the two passing times are respectively text message-based verification and fingerprint verification.

(13) Delete the identified verification method from the verification method list.

Specifically, the verification method list is searched for any verification method identified in step (12). When the verification method list includes the verification method, the verification method is deleted from the verification method list. The described operation is performed for any other verification method identified in step (12). As such, all verification methods identified in step (12) are deleted from the verification method list.

For example, in the example in step (12), identified verification methods are text message-based verification and fingerprint verification. The verification method list shown in Table 1 is searched for text message-based verification, and it is determined that the verification method list shown in Table 1 includes text message-based verification. In this case, text message-based verification is deleted from the verification method list shown in Table 1, to obtain a verification method list shown in Table 3.

TABLE 3

Email-based verification
Facial verification
Email-based verification and security question verification Then the verification method list shown in Table 3 is searched for fingerprint verification, and it is determined that the verification method list shown in Table 3 does not include fingerprint verification. In this case, the verification method list shown in Table 3 is determined as a post-removal verification method list.

In step S203, a verification method in one row in a post-removal verification method list is obtained.

The purpose of the present disclosure is to determine one row from the verification method list and perform verification on the user by using all verification methods in the determined row. After the user is verified in all the verification methods in the determined row, the server can determine that the user is currently verified.

Therefore, in this embodiment of the present disclosure, the server can actively select one row from the post-removal verification method list. For example, the server can randomly select one row from the post-removal verification method list, and then obtain all verification methods in the selected row.

In another embodiment of the present disclosure, the server can send the post-removal verification method list to the terminal, so that the terminal displays the post-removal verification method list to the user. The user can select one row from the post-removal verification method list displayed by the terminal. The terminal sends the row selected by the user to the server. The server obtains a verification method in the row selected by the user.

The server can determine that the user is currently verified only after the user is verified in all verification methods in one row in the verification method list. Therefore, if the user selects a row that includes only one verification method, the user can be currently verified if the user is verified by that verification method. If the user selects a row that includes multiple verification methods, the user can be currently verified only if the user is verified by the multiple verification methods separately. Therefore, the user usually selects a row that includes fewer verification methods from the post-removal verification method list, so that the user can be currently verified as soon as possible.

For example, in the post-removal verification method list shown in Table 3, the first row and the second row include fewer verification methods, but the third row includes more verification methods. Therefore, the user usually selects the first row or the second row to be currently verified.

Therefore, in the present step, if the server actively selects one row from the post-removal verification method list, the server can select a row that includes fewer verification methods, so that the user can be currently verified as soon as possible.

Figure 3:
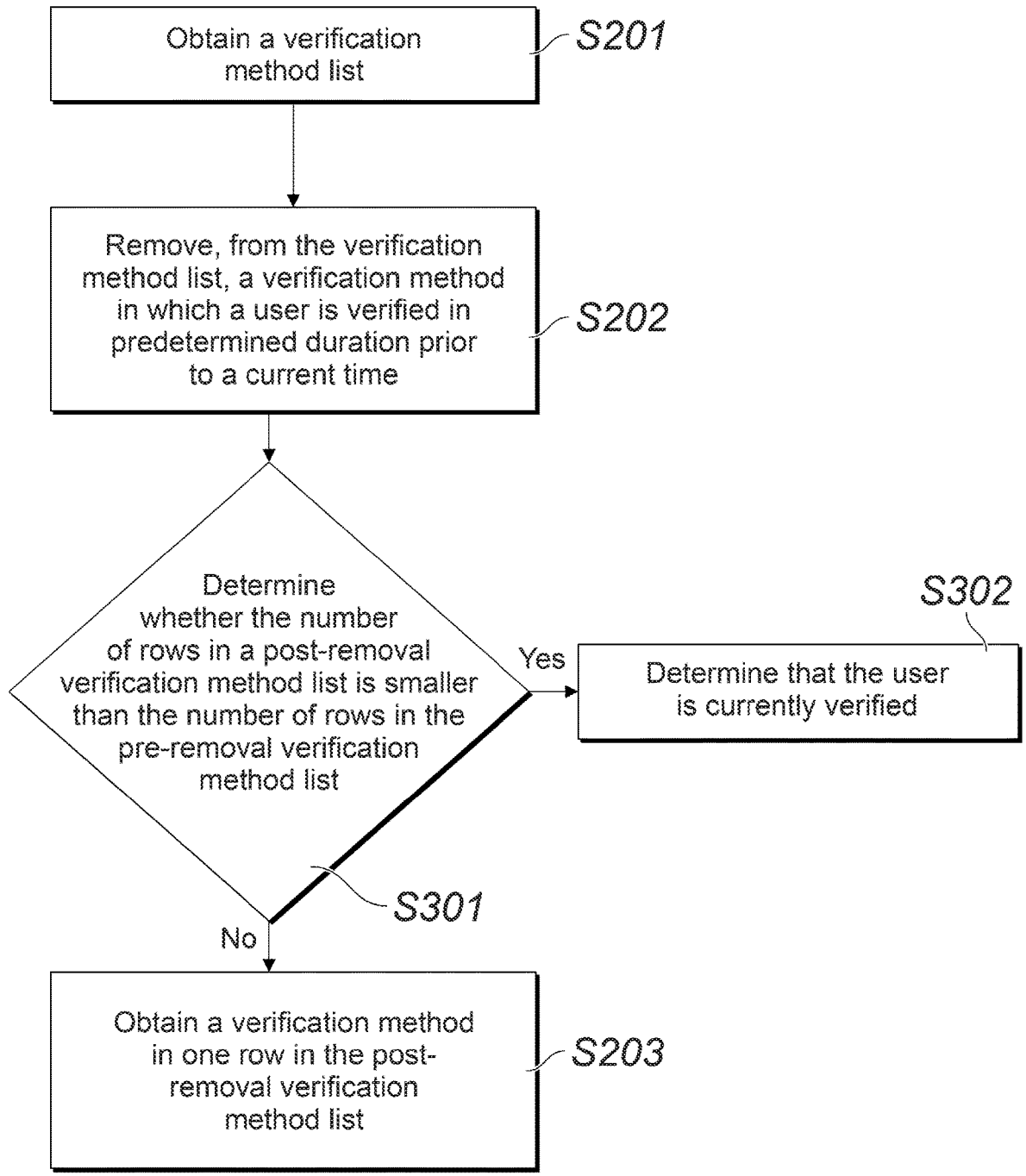
FIG. 3 is a flowchart illustrating a verification method according to an exemplary embodiment.

As described in the previous embodiment, the user can be currently verified once the user is verified in all verification methods in any row in the verification method list. Therefore, to ensure the user be currently verified as soon as possible, in another embodiment of the present disclosure, after step S202, as shown in FIG. 3, the method further includes the following steps.

In step S301, it is determined whether the number of rows in the post-removal verification method list is smaller than the number of rows in the pre-removal verification method list.

In some situations, if all verification methods in a certain row in the verification method list are verification methods in which the user is verified in the predetermined duration prior to the current time, all the verification methods in the row are removed in step S202, the row is no longer included in the verification method list. As such, the number of rows in the post-removal verification method list is smaller than the number of rows in the pre-removal verification method list.

For example, if verification methods in which the user is verified in the predetermined duration prior to the current time are text message-based verification and facial verification, text message-based verification and facial verification are removed from the verification method list shown in Table 1 in step S202, to obtain a verification method list shown in Table 4.

TABLE 4

Email-based verification
Email-based verification and security question verification There are two rows in the verification method list shown in Table 4, but there are three rows in the pre-removal verification method list shown in Table 1. As such, it can be determined that the number of rows in the post-removal verification method list is smaller than the number of rows in the pre-removal verification method list. Then step S302 is performed.

In step S302, when the number of rows in the post-removal verification method list is smaller than the number of rows in the pre-removal verification method list, it is determined that the user is currently verified.

In this embodiment of the present disclosure, the user can be currently verified once the user is verified in all verification methods in any row in the verification method list. Therefore, once it is determined that the number of rows in the post-removal verification method list is smaller than the number of rows in the pre-removal verification method list, it indicates that the user is verified in all verification methods in any one of removed rows in the predetermined duration prior to the current time. Therefore, no verification needs to be performed on the user, and it can be determined that the user is currently verified. The process ends.

When the number of rows in the post-removal verification method list is equal to the number of rows in the pre-removal verification method list, step S203 is performed: Obtain a verification method in one row in a post-removal verification method list.

In this embodiment of the present disclosure, when the number of rows in the post-removal verification method list is equal to the number of rows in the pre-removal verification method list, verification methods in one row may include verification methods in another row in the post-removal verification method list, that is, the row includes the verification methods in another row, but the number of verification methods in the row is greater than the number of verification methods in another row.

For example, in the verification method list shown in Table 3, verification methods in the third row are email-based verification and security question verification, and a verification method in the first row is email-based verification. The third row includes email-based verification in the first row, and the number of verification methods in the third row is greater than the number of verification methods in the first row. Therefore, the verification methods in the third row include the verification method in the first row.

The user can be currently verified once the user is verified via email-based verification if the user selects the first row, but the user can be currently verified only when the user is verified via both email-based verification and security question verification if the user selects the third row. Therefore, the user usually prefers the first row to the third row to be currently verified as soon as possible.

However, the server may sometimes actively select one row from the post-removal verification method list. If the server selects the third row instead of the first row, the user needs to be verified via both email-based verification and security question verification. In this case, the user cannot be currently verified as soon as possible.

Therefore, in this embodiment of the present disclosure, when the number of rows in the post-removal verification method list is equal to the number of rows in the pre-removal verification method list, the server determines whether verification methods in any row in the post-removal verification method list include verification methods in another row. When the verification methods in the row include verification methods in another row, the server deletes the row from the post-removal verification method list. The server performs the described operation on any other row.

For example, the third row is deleted from the verification method list shown in Table 3, to obtain a verification method list shown in Table 5. When selecting one row from the verification method list shown in Table 5, besides selecting the second row that includes facial verification, the server can select the first row that includes email-based verification, and the server cannot select the original third row that includes email-based verification and security question verification in Table 3. As such, the server performs verification on the user only via email-based verification, and the user can be currently verified once the user is verified via email-based verification. Therefore, the user can be verified as soon as possible, and verification efficiency is increased.

TABLE 5

Email-based verification
Facial verification

Further, in the described embodiment of the present disclosure, after the server performs verification on the user by using a verification method in which the user failed to pass verification, when the user is verified in the verification method, the server obtains a current local time and uses the current local time as a passing time when the user is verified in the verification method, and then substitutes, in the locally stored correspondence between a verification method and a passing time, the passing time for a passing time corresponding to the verification method, so that the passing time indicating the time the user is verified by the verification method can be updated.

Figure 4:
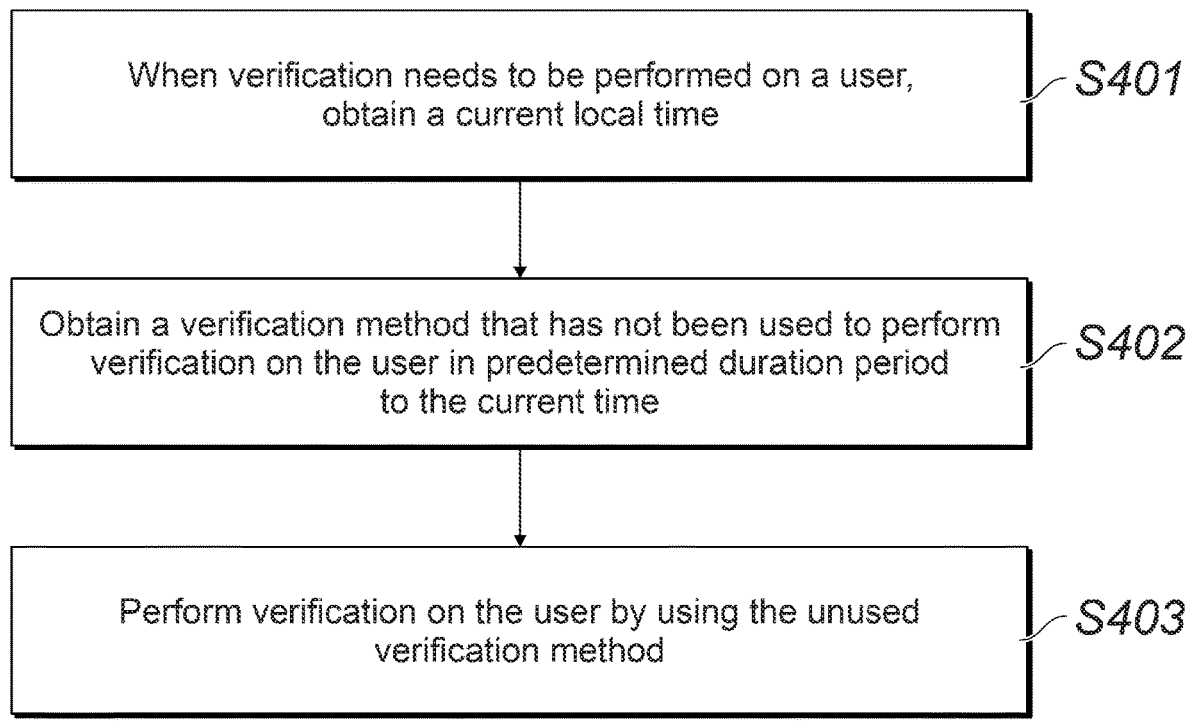
FIG. 4 is a flowchart illustrating a verification method according to an exemplary embodiment.

FIG. 4 is a flowchart illustrating a verification method according to an exemplary embodiment. As shown in FIG. 4, the method includes the following steps.

In step S401, a current local time is obtained when verification needs to be performed on a user.

In the process of using the terminal, the user sometimes needs to perform a sensitive operation that is related to property security of the user on the terminal, for example, changing an account password, online shopping, or online transfer. When the terminal receives a user's input that is a sensitive operation closely relating to property security of the user that is input by the user, it generates a sensitive request and sends the sensitive request to a server. When the server receives the sensitive request sent by the terminal, to ensure property security of the user, the server needs to perform verification on the identity of the user before responding to the sensitive request, to ensure that the sensitive operation is performed by the user. When the user is verified, the server responds to the sensitive request.

For the server, when receiving the sensitive request sent by the terminal, it determines to perform verification on the user and obtains the current local time.

In step S402, a verification method that has not been used to perform verification on the user in predetermined duration prior to the current time is obtained.

The predetermined duration can be a duration that is set by a technician on the server in advance, and can be 30 seconds, 1 minute, or 2 minutes, and the like. This is not limited in the present disclosure.

Among them, there are many verification methods for the server to verify the user. For example, text message-based verification, email-based verification, facial verification, security question verification, fingerprint verification, etc.

In this embodiment of the present disclosure, the server may perform verification on the user only by using some of the multiple verification methods in the predetermined duration prior to the current time.

For example, suppose the predetermined duration is 10 minutes. Within 10 minutes prior to the current time, if the server performs verification on the identity of the user via text message-based verification, the text message-based verification is a verification method that has been used to perform verification on the user in the predetermined duration prior to the current time. With 10 minutes prior to the current time, if the server does not perform verification on the identity of the user via email-based verification, the email-based verification is a verification method that has not been used to perform verification on the user in the predetermined duration prior to the current time.

In step S403, verification is performed on the user by using the unused verification method.

In the existing technology, a server performs verification on an identity of a user via text message-based verification each time the user performs a sensitive operation. If the user performs multiple sensitive operations in a short period of time, the server performs verification on the user multiple times by using the same verification method in a short period of time, resulting in relatively low user experience In this embodiment of the present disclosure, when verification needs to be performed on a user, a verification method that has not been used to perform verification on the user in predetermined duration prior to a current time is obtained, and then verification is performed on the user by using the obtained verification method. Therefore, using a same verification method to verify the user multiple times in a short period of time is avoided, and user experience is improved.

Figure 5:
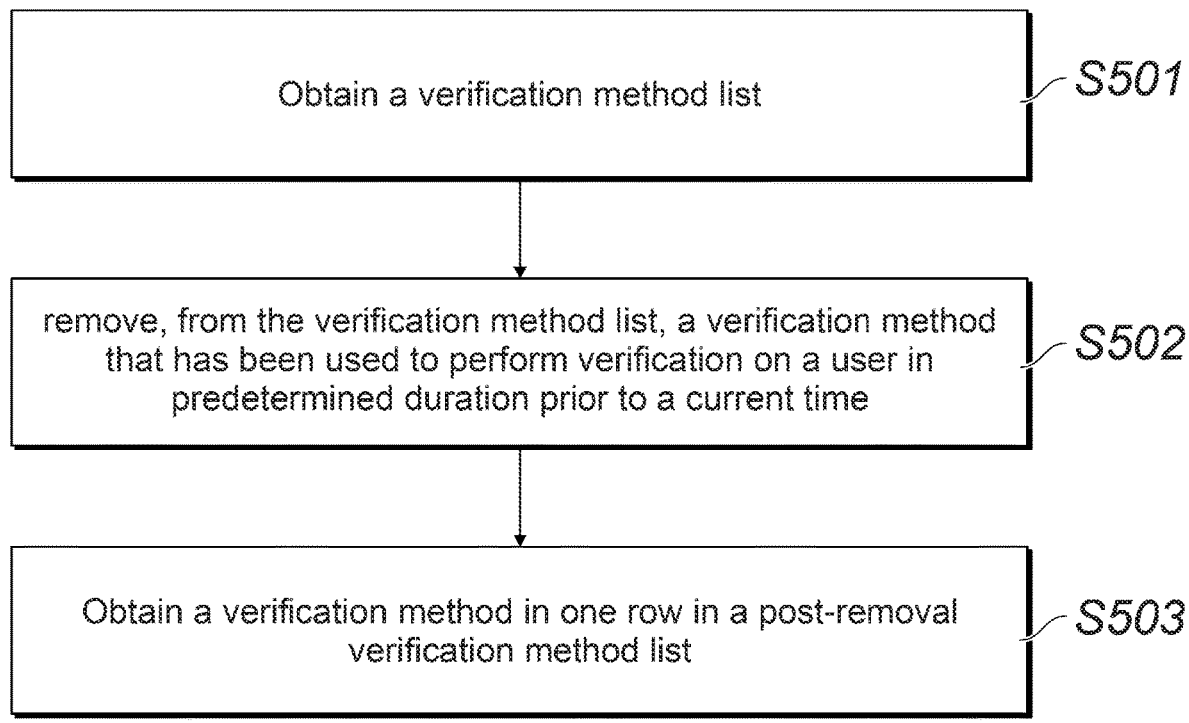
FIG. 5 is a flowchart illustrating a verification method according to an exemplary embodiment.

In another embodiment of the present disclosure, as shown in FIG. 5, step S402 includes the following steps.

In step S501, a verification method list is obtained.

There are multiple rows in the verification method list. Each row includes at least one verification method, and verification methods included in any two rows are not completely the same. If a row includes multiple verification methods, any two verification methods in the row are different.

For example, the verification method list can be shown in Table 6. There are three rows in Table 6. The first row includes two verification methods: text message-based verification and email-based verification. The second row includes one verification method: facial verification. The third row includes two verification methods: email-based verification and security question verification.

TABLE 6

| Text message-based verification and email-based verification |
| Facial verification |
| Email-based verification and security question verification |

In step S502, a verification method that has been used to perform verification on the user in the predetermined duration prior to the current time is removed from the verification method list.

The present step can be specifically implemented in the following processes, including:

(21) Obtain a correspondence between a verification method and a verification time.

In this embodiment of the present disclosure, each time the server performs verification on the user by using a certain verification method, the server obtains a current local time and uses the current local time as the verification time of performing verification on the user, and then searches the locally stored correspondence between a verification method and a verification time to determine whether the verification method exists.

When the correspondence does not include the verification method, it indicates that the verification method has not been previously used to perform verification on the user. In this case, the verification method and the verification time are stored as one record in the correspondence.

When the correspondence includes the verification method, it indicates that the verification method has been previously used to perform verification on the user. In this case, the correspondence needs to be searched for a verification time corresponding to the verification method, and then the obtained verification time is substituted for the identified verification time, so that the verification time of performing verification on the user by using the verification method can be updated.

As such, if a latest verification time of previously performing verification on the user in a certain verification method needs to be searched for, the server can obtain the locally stored correspondence between a verification method and a verification time, and then search the correspondence for a verification time corresponding to the verification method, so as to obtain the latest verification time of previously performing verification on the user in the verification method.

For example, the correspondence between a verification method and a verification time can be shown in Table 7.

TABLE 7

| Verification method | Verification time |
| --- | --- |
| Email-based verification | 09:09:22 |
| Text message-based verification | 13:05:27 |
| Facial verification | 12:08:12 |
| Security question verification | 11:32:45 |
| Fingerprint verification | 13:01:21 |

As shown in Table 7, previously, verification methods that have been used to perform verification on the user include email-based verification, text message-based verification, facial verification, security question verification, and fingerprint verification. The latest verification time of performing verification on the user via email-based verification is 09:09:22, the latest verification time of performing verification on the user via text message-based verification is 13:05:27, the latest verification time of performing verification on the user via facial verification is 12:08:12, the latest verification time of performing verification on the user via security question verification is 11:32:45, and the latest verification time of performing verification on the user via fingerprint verification is 13:01:21.

(22) Search the correspondence for a verification method corresponding to a verification time, where a difference between the verification time and the current time is smaller than the predetermined duration.

A verification time included in any record in the correspondence is obtained. The verification time is subtracted from the current time to obtain duration. The duration is compared with the predetermined duration. If the duration is smaller than the predetermined duration, a verification method included in the record is obtained and is used as a verification method corresponding to a verification time, where a difference between the verification time and the current time is smaller than the predetermined duration.

The described operation is performed on any other record in the correspondence. As such, all verification methods corresponding to verification times are identified from the correspondence, where a difference between the verification time and the current time is smaller than the predetermined duration.

For example, the current time is 13:10:04, and the predetermined duration is 10 minutes. Verification times 13:05:27 and 13:01:21 can be identified from the correspondence shown in Table 7, where a difference between the verification time and the current time 13:10:04 is smaller than 10 minutes, and it can be determined that verification methods corresponding to the two verification times are respectively text message-based verification and fingerprint verification.

(23) Delete the identified verification method from the verification method list.

Specifically, the verification method list is searched for any verification method identified in step (22). When the verification method list includes the verification method, the verification method is deleted from the verification method list. The described operation is performed for any other verification method identified in step (22). As such, all verification methods identified in step (22) are deleted from the verification method list.

For example, in the example in step (22), identified verification methods are text message-based verification and fingerprint verification. The verification method list shown in Table 6 is searched for text message-based verification, and it is determined that the verification method list shown in Table 6 includes text message-based verification. In this case, text message-based verification is deleted from the verification method list shown in Table 6, to obtain a verification method list shown in Table 8.

TABLE 8

Email-based verification
Facial verification
Email-based verification and security question verification Then the verification method list shown in Table 8 is searched for fingerprint verification, and it is determined that the verification method list shown in Table 8 does not include fingerprint verification. In this case, the verification method list shown in Table 8 is determined as a post-removal verification method list.

In step S503, a verification method in one row in a post-removal verification method list is obtained.

The purpose of the present disclosure is to determine one row from the verification method list and perform verification on the user by using all verification methods in the determined row. After the user is verified in all the verification methods in the determined row, the server can determine that the user is currently verified.

Therefore, in this embodiment of the present disclosure, the server can actively select one row from the post-removal verification method list. For example, the server can randomly select one row from the post-removal verification method list, and then obtain all verification methods in the selected row.

In another embodiment of the present disclosure, the server can send the post-removal verification method list to the terminal, so that the terminal displays the post-removal verification method list to the user. The user can select one row from the post-removal verification method list displayed by the terminal. The terminal sends the row selected by the user to the server. The server obtains a verification method in the row selected by the user.

The server can determine that the user is currently verified only after the user is verified in all verification methods in one row in the verification method list. Therefore, if the user selects a row that includes only one verification method, the user can be currently verified if the user is verified by that verification method. If the user selects a row that includes multiple verification methods, the user can be currently verified only if the user is verified by the multiple verification methods separately. Therefore, the user usually selects a row that includes fewer verification methods from the post-removal verification method list, so that the user can be currently verified as soon as possible.

For example, in the post-removal verification method list shown in Table 8, the first row and the second row include fewer verification methods, but the third row includes more verification methods. Therefore, the user usually selects the first row or the second row to be currently verified.

Therefore, in the present step, if the server actively selects one row from the post-removal verification method list, the server can select a row that includes fewer verification methods, so that the user can be currently verified as soon as possible.

Figure 6:
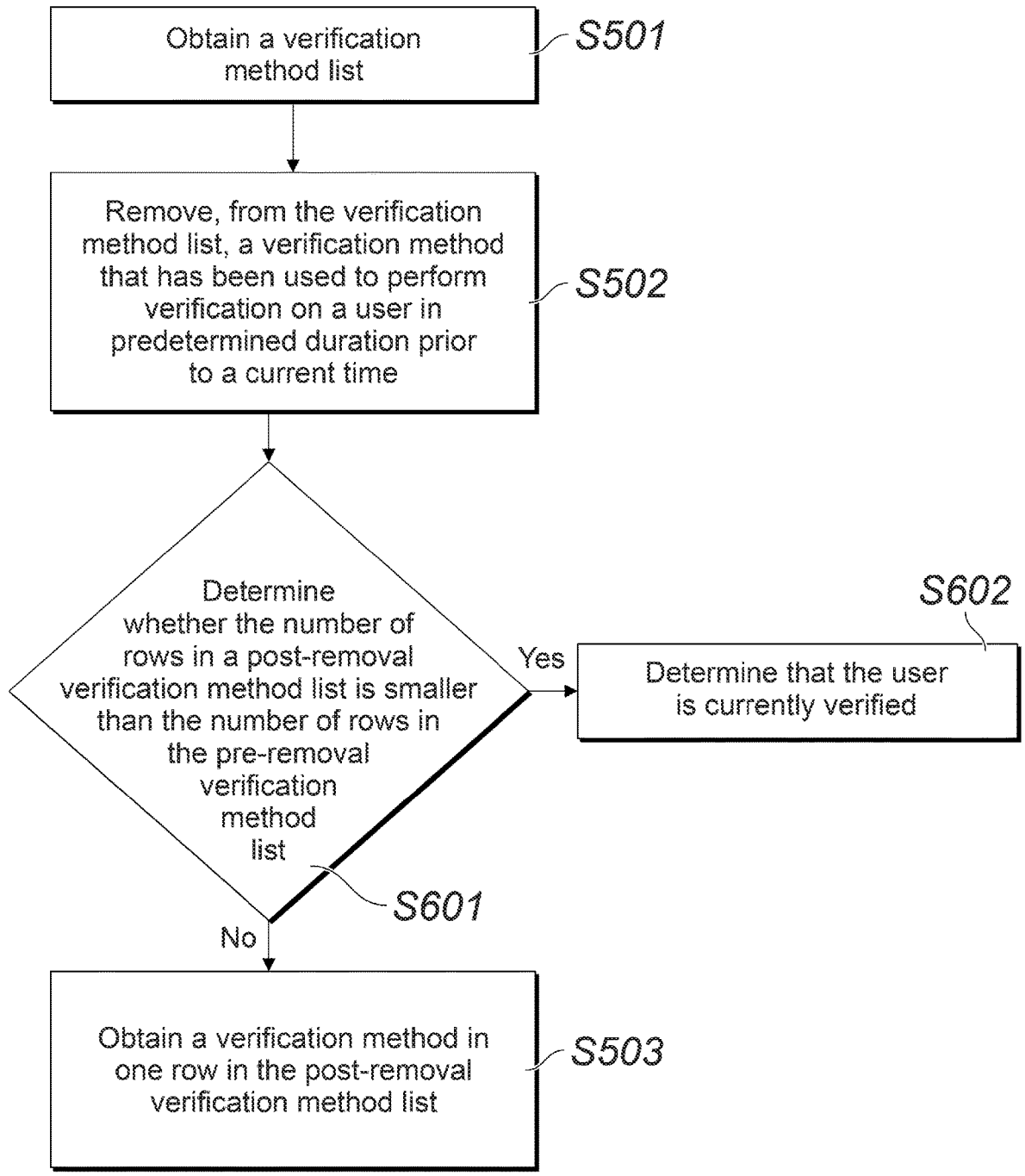
FIG. 6 is a flowchart illustrating a verification method according to an exemplary embodiment.

As described in the previous embodiment, the user can be currently verified once the user is verified in all verification methods in any row in the verification method list. Therefore, to ensure the user be currently verified as soon as possible, in another embodiment of the present disclosure, after step S502, as shown in FIG. 6, the method further includes the following steps.

In step S601, it is determined whether the number of rows in the post-removal verification method list is smaller than the number of rows in the pre-removal verification method list.

In some situations, if all verification methods in a certain row in the verification method list are verification methods in which the user is verified in the predetermined duration prior to the current time, all the verification methods in the row are removed in step S502, that is, the row is no longer included in the verification method list. As such, the number of rows in the post-removal verification method list is smaller than the number of rows in the pre-removal verification method list.

For example, if verification methods that have been used to perform verification on the user in the predetermined duration prior to the current time are text message-based verification and facial verification, after step S502, after text message-based verification and facial verification are removed from the verification method list shown in Table 6, a verification method list shown in Table 9 can be obtained.

TABLE 9

Email-based verification
Email-based verification and security question verification There are two rows in the verification method list shown in Table 9, but there are three rows in the pre-removal verification method list in Table 6. As such, it can be determined that the number of rows in the post-removal verification method list is smaller than the number of rows in the pre-removal verification method list. Then step S602 is performed.

In step S602, when the number of rows in the post-removal verification method list is smaller than the number of rows in the pre-removal verification method list, it is determined that the user is currently verified.

In this embodiment of the present disclosure, the user can be currently verified once the user is verified in all verification methods in any row in the verification method list. Therefore, once it is determined that the number of rows in the post-removal verification method list is smaller than the number of rows in the pre-removal verification method list, it indicates that the user is verified in all verification methods in any one of removed rows in the predetermined duration prior to the current time. Therefore, no verification needs to be performed on the user, and it can be determined that the user is currently verified. The process ends.

When the number of rows in the post-removal verification method list is equal to the number of rows in the pre-removal verification method list, step S503 is performed: Obtain a verification method in one row in a post-removal verification method list.

In this embodiment of the present disclosure, when the number of rows in the post-removal verification method list is equal to the number of rows in the pre-removal verification method list, verification methods in one row may include verification methods in another row in the post-removal verification method list, that is, the row includes the verification methods in another row, but the number of verification methods in the row is greater than the number of verification methods in another row.

For example, in the verification method list shown in Table 8, verification methods in the third row are email-based verification and security question verification, and a verification method in the first row is email-based verification. The third row includes email-based verification in the first row, and the number of verification methods in the third row is greater than the number of verification methods in the first row. Therefore, the verification methods in the third row include the verification method in the first row.

The user can be currently verified once the user is verified via email-based verification if the user selects the first row, but the user can be currently verified only when the user is verified via both email-based verification and security question verification if the user selects the third row. Therefore, the user usually prefers the first row to the third row to be currently verified as soon as possible.

However, the server may sometimes actively select one row from the post-removal verification method list. If the server selects the third row instead of the first row, the user needs to be verified via both email-based verification and security question verification. In this case, the user cannot be currently verified as soon as possible.

Therefore, in this embodiment of the present disclosure, when the number of rows in the post-removal verification method list is equal to the number of rows in the pre-removal verification method list, the server determines whether verification methods in any row in the post-removal verification method list include verification methods in another row. When the verification methods in the row include verification methods in another row, the server deletes the row from the post-removal verification method list. The server performs the described operation on any other row.

For example, the third row is deleted from the verification method list shown in Table 8, to obtain a verification method list shown in Table 10. When selecting one row from the verification method list shown in Table 10, besides selecting the second row that includes facial verification, the server can select the first row that includes email-based verification, and the server cannot select the original third row that includes email-based verification and security question verification in Table 8. As such, the server performs verification on the user only via email-based verification, and the user can be currently verified once the user is verified via email-based verification. Therefore, the user can be verified as soon as possible, and verification efficiency is increased.

TABLE 10

| Email-based verification |
| Facial verification |

Further, in the described embodiment of the present disclosure, after the server performs verification on the user by using an unused verification method, the server obtains a current local time and uses the current local time as a verification time of performing verification on the user by using the unused verification method, and then substitutes, in the locally stored correspondence between a verification method and a verification time, the verification time for a verification time corresponding to the verification method, so that the verification time of performing verification on the user by using the verification method can be updated.

Figure 7:
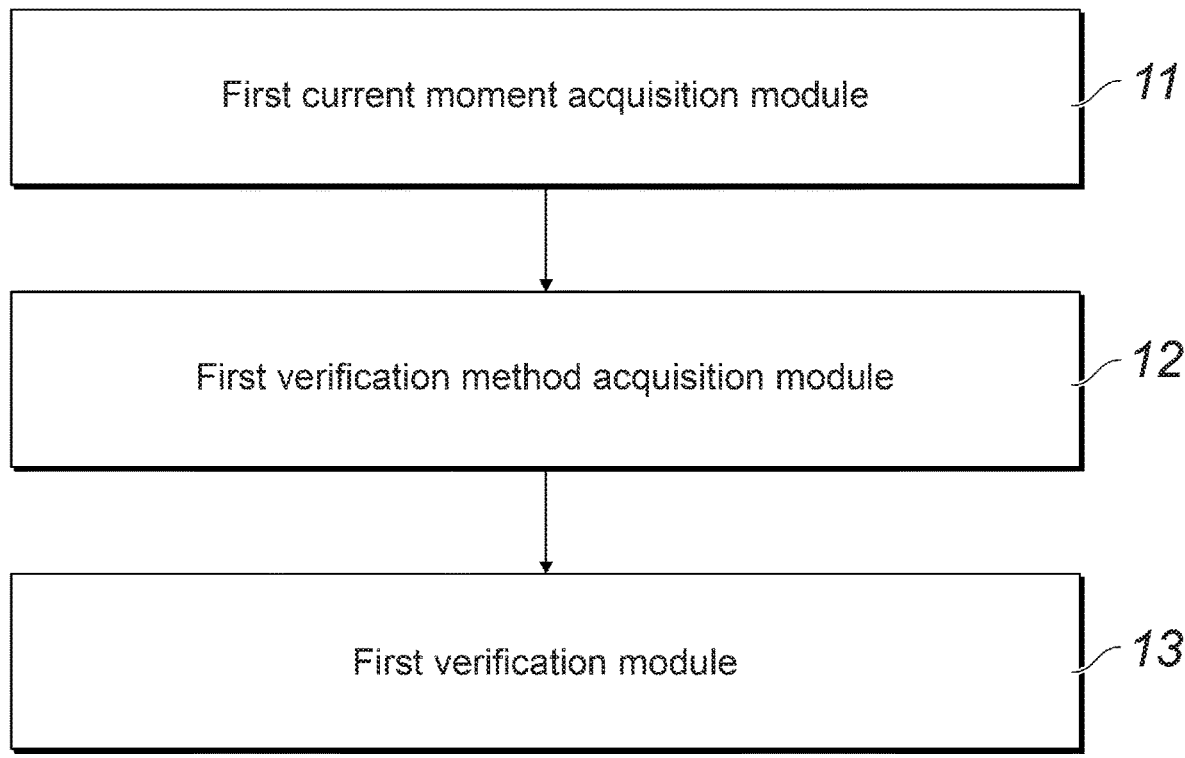
FIG. 7 is a block diagram illustrating a verification device according to an exemplary embodiment.

FIG. 7 is a block diagram illustrating a verification device according to an exemplary embodiment. Referring to FIG. 7, the device includes: a first current time acquisition module 11, configured to: when verification needs to be performed on a user, obtain a current local time; a first verification method acquisition module 12, configured to obtain a verification method in which the user failed to pass verification in predetermined duration prior to the current time; and a first verification module 13, configured to perform verification on the user by using the verification method in which the user failed to pass verification.

In the existing technology, a server performs verification on an identity of a user via text message-based verification each time the user performs a sensitive operation. If the user performs multiple sensitive operations in a short period of time, the server performs verification on the user multiple times by using the same verification method in a short period of time, resulting in relatively low user experience.

In this embodiment of the present disclosure, when verification needs to be performed on a user, a verification method in which the user failed to pass verification in predetermined duration prior to a current time is obtained, and then verification is performed on the user by using the obtained verification method. Therefore, using a same verification method to verify the user multiple times in a short period of time is avoided, and user experience is improved.

The first verification method acquisition module 12 includes: a first verification method list acquisition unit, configured to obtain a verification method list, where each row in the verification method list includes at least one verification method; a first removal unit, configured to remove, from the verification method list, a verification method in which the user is verified in the predetermined duration prior to the current time; and a first verification method acquisition unit, configured to obtain a verification method in one row in a post-removal verification method list.

The first removal unit includes: a first acquisition subunit, configured to obtain a locally stored correspondence between a verification method and a passing time; a first search subunit, configured to search the correspondence for a verification method corresponding to a passing time, where a difference between the passing time and the current time is smaller than the predetermined duration; and a first deletion subunit, configured to delete the identified verification method from the verification method list.

The device further includes: a passing time acquisition module, configured to: when the user is verified in the verification method in which the user is previously unverified, obtain a current local time and determine the current local time as a passing time when the user is verified in the verification method in which the user is previously unverified; and a first substitution module, configured to substitute, in the correspondence, the determined passing time for a passing time corresponding to the verification method in which the user is previously unverified.

The first verification method acquisition module 12 further includes: a first judging unit, configured to determine whether the number of rows in the post-removal verification method list is smaller than the number of rows in the pre-removal verification method list; and a first determining unit, configured to: when the number of rows in the post-removal verification method list is smaller than the number of rows in the pre-removal verification method list, determine that the user is currently verified.

The first verification method acquisition unit is further configured to: when the number of rows in the post-removal verification method list is equal to the number of rows in the pre-removal verification method list, perform the step of obtaining a verification method in one row in a post-removal verification method list.

Figure 8:
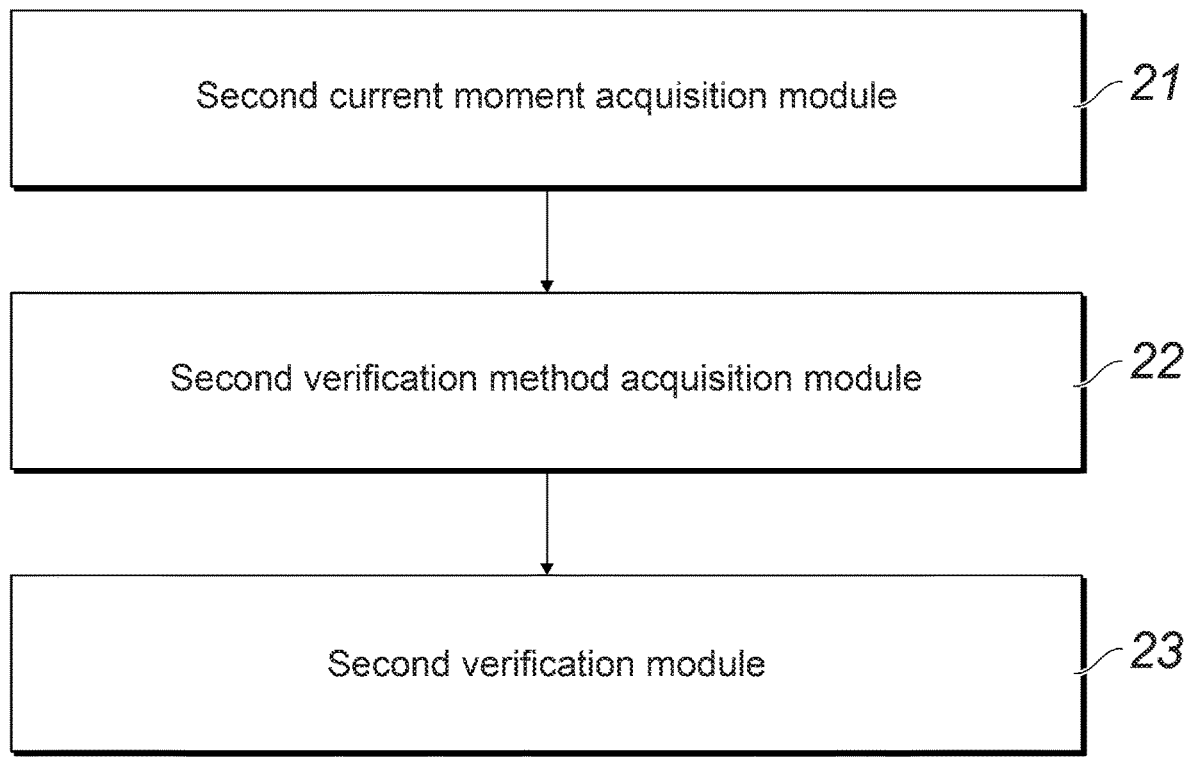
FIG. 8 is a block diagram illustrating a verification device according to an exemplary embodiment.

FIG. 8 is a block diagram illustrating a verification device according to an exemplary embodiment. Referring to FIG. 8, the device includes: a second current time acquisition module 21, configured to: when verification needs to be performed on a user, obtain a current local time; a second verification method acquisition module 22, configured to obtain a verification method that has not been used to perform verification on the user in predetermined duration prior to the current time; and a second verification module 23, configured to perform verification on the user by using the unused verification method.

In the existing technology, a server performs verification on an identity of a user via text message-based verification each time the user performs a sensitive operation. If the user performs multiple sensitive operations in a short period of time, the server performs verification on the user multiple times by using the same verification method in a short period of time, resulting in relatively low user experience.

In this embodiment of the present disclosure, when verification needs to be performed on a user, a verification method that has not been used to perform verification on the user in predetermined duration prior to a current time is obtained, and then verification is performed on the user by using the obtained verification method. Therefore, using a same verification method to verify the user multiple times in a short period of time is avoided, and user experience is improved.

The second verification method acquisition module 22 includes: a second verification method list acquisition unit, configured to obtain a verification method list, where each row in the verification method list includes at least one verification method; a second removal unit, configured to remove, from the verification method list, a verification method that has been used to perform verification on the user in the predetermined duration prior to the current time; and a second verification method acquisition unit, configured to obtain a verification method in one row in a post-removal verification method list.

The second removal unit includes: a second acquisition subunit, configured to obtain a locally stored correspondence between a verification method and a verification time; a second search subunit, configured to search the correspondence for a verification method corresponding to a verification time, where a difference between the verification time and the current time is smaller than the predetermined duration; and a second deletion subunit, configured to delete the identified verification method from the verification method list.

The device further includes: a verification time acquisition module, configured to: when verification is performed on the user by using the unused verification method, obtain a current local time and determine the current local time as a verification time of performing verification on the user by using the unused verification method; and a second substitution module, configured to substitute, in the correspondence, the determined verification time for a verification time corresponding to the unused verification method.

The second verification method acquisition module 22 further includes: a second judging unit, configured to determine whether the number of rows in the post-removal verification method list is smaller than the number of rows in the pre-removal verification method list; and a second determining unit, configured to: when the number of rows in the post-removal verification method list is smaller than the number of rows in the pre-removal verification method list, determine that the user is currently verified.

The second verification method acquisition unit is further configured to: when the number of rows in the post-removal verification method list is equal to the number of rows in the pre-removal verification method list, perform the step of obtaining a verification method in one row in a post-removal verification method list.

For the device in the embodiment, a specific method that each module performs an operation has been described in detail in the related method embodiment, and details are not described herein.

A person skilled in the art can easily figure out another implementation solution of the present disclosure after considering the specification and practicing the present disclosure. The present application is intended to cover any variations, functions, or adaptive changes of the present disclosure. These variations, functions, or adaptive changes comply with general principles of the present disclosure, and include common knowledge or a commonly used technical means in the technical field that is not disclosed in the present disclosure. The specification and the embodiments are merely considered as examples, and the actual scope and the spirit of the present disclosure are indicated by the following claims.

It should be understood that the present disclosure is not limited to the accurate structures that are described above and that are shown in the accompanying drawings. Modifications and changes can be made within the scope of the present disclosure. The scope of the present disclosure is limited only by the appended claims.

Figure 9:
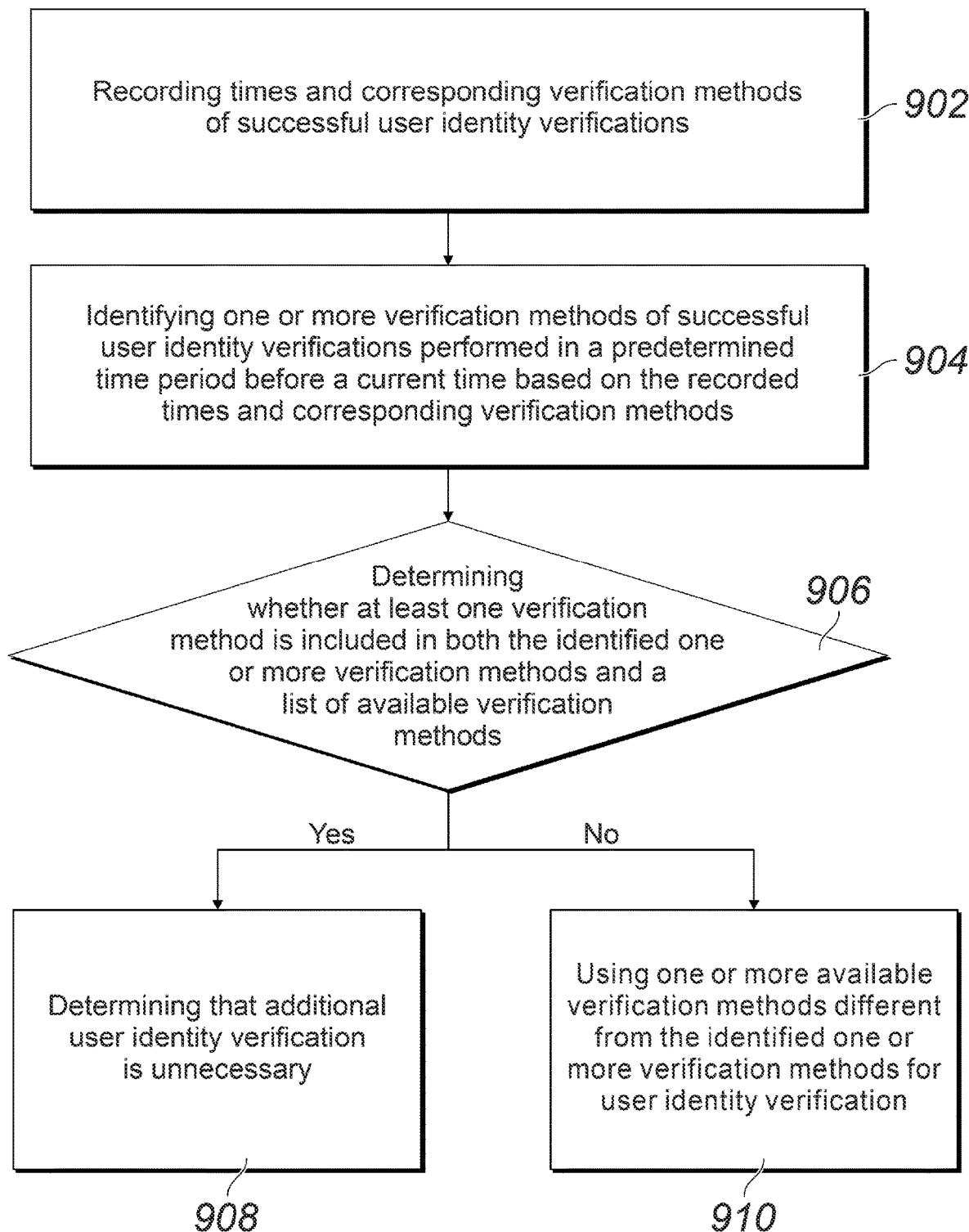
FIG. 9 is a flowchart illustrating an example of a method for user identity verification, according to an embodiment of the present disclosure.

FIG. 9 is a flowchart illustrating an example of a method 900 for user identity verification, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, times and corresponding verification methods of successful user identity verifications are recorded. In some cases, when a user identity verification is successfully performed and the user is logged in for using a service, the server providing the service can record time and verification method used for the successful login. The verification methods can include any methods suitable for user identity verification, such as e-mail verification, text message verification, security question verification, or biometric authentication such as fingerprint, facial recognition, voice recognition, etc. In some cases, the recorded verification methods can be saved to a list of available verification methods for user identity verification stored locally on the server. Example correspondences between the recorded successful login times and verification methods are shown in Table 2, where "passing time". From 902, method 900 proceeds to 904

At 904, one or more verification methods of successful user identity verifications performed in a predetermined time period before a current time are identified based on the recorded times and corresponding verification methods. The predetermined time period can be determined based on the verification method or the type of service that needs user identity verification. Referring back to the example shown in Table 2, if the current time is 13:10:00, and the predetermined time period is 10 minutes, the verification methods of successful user identity verifications within 10 minutes of the current time is text message-based verification succeeded at 13:05:27 and fingerprint verification succeeded at 13:01:21. From 904, method 900 proceeds to 906.

At 906, a determination is made as to whether at least one verification method is included in either the identified one or more verification methods and a list of available verification methods. If yes, method 900 proceeds to 908. Otherwise, method 900 proceeds to 910. The identified one or more verification methods are compared with a list of available verification methods. The list of available verification methods can be locally stored on the server. In some cases, the list of available verification methods can include one or more rows. Each row can include one or more verification methods. An example list of available verification methods is shown in Table 1. As shown in Table 1, the list of available verification methods include three rows. The first and third rows include two available verification methods. The second row includes one available verification method. For example, if text-message based verification and fingerprint verification are the identified verification methods, after comparison, the text message-based verification can be identified to be included in the list of available verification methods. Fingerprint verification is not included in the list of available verification methods. Text message-based verification can be deleted from the list of available verification methods since it has just been used to successfully perform user identity verification. In some cases, since fingerprint verification is not included in the list, it can be added to the list as an available verification method.

When a verification method is identified to be successfully performed in a predetermined time period, it can be deleted from the list of verification methods to avoid being used again for user identity verification or determine that additional user identity verification is unnecessary. In some cases, the list of verification methods is organized as one or more rows such as the list shown in Table 1. In some cases, after deletion of identified verification methods successfully performed in the predetermined time period, if a row is deleted from the list, additional user identity verification can be determined to be unnecessary. Otherwise, a row can be randomly selected from the remaining list of available verification methods, and the verification methods in the selected row can be used for user identity verification. For example, assume that the list of available verification methods is shown in Table 1, the identified one or more verification methods of successful user identity verifications performed in the predetermined time period is text message-based verification and fingerprint verification. Because text message-based verification is included in Table 1, it can be deleted from Table 1. The remaining list of available verification methods then becomes the one shown in Table 3. One of the rows in Table 3 can be randomly selected and the verification methods included in the row can be used for user identity verification. In some cases, a user's identity can be verified when all verification methods included in a selected row are successfully performed. For example, if row 3 of Table 3 is selected, then e-mail verification and security question verification need to be performed for user identity verifications. In some cases, a row that has the least number of verification methods in the remaining list of available verification methods can be selected to perform user identity verification. Using again Table 3 as an example, rows 1 and 2 have the least number of verification methods, and one of e-mail verification and facial recognition included in rows 1 and 2 respectively can be selected to perform user identity verification. From 906, method 900 proceeds to 908.

At 908, additional user identity verification is determined to be unnecessary, because the at least one verification method was just successfully used to verify user identity in the predetermined period of time. In some cases, the list of available verification methods include one or more rows, and a user's identity can be verified only when all verification methods included in a row are successfully performed. In such cases, additional verification is unnecessary when the at least one verification method is included in a row that does not include other verification methods.

At 910, one or more available verification methods different from the identified one or more verification methods are used for user identity verification.

Implementations of the subject matter described in this specification can be implemented so as to realize particular advantages or technical effects. For example, implementations of the subject matter can reduce the chance of requesting a user to use the same verification method to perform identity verification multiple times in a short period of time. Implementations of the subject matter can also reduce the chance of requesting the user to use again a previously failed verification method to improve user experience.

The described methodology permits enhancement of various mobile computing device data security. Service providers can process user service request sent by mobile computing devices to ensure the user is authorized so that the legitimate users will not be victims of fraud.

The described methodology can ensure the efficient usage of computer resources (for example, processing cycles, network bandwidth, and memory usage), through reducing the amount of redundant user identity verifications. Recently performed user identity verification method can be determined to avoid reauthorization and simpler user identity verification method can be selected to improve identity verification efficiency. At least these actions can minimize or prevent waste of available computer resources and achieve a better balance between resource consumption and data security.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
recording, by a server, times and corresponding verification methods of successful user identity verifications, wherein the server records a time and a corresponding verification method when a user identity verification has been used to successfully verify a user, and the corresponding verification method is one of a plurality of verification methods available for the server to verify the user;
receiving, by the server and from a terminal, a verification request associated with a user operation related to a security property of the user that requires an identity verification of the user;
in response to receiving the verification request, determining, by the server, a current local time of the server when the verification request was received;
identifying, by the server, one or more verification methods of successful user identity verifications from the recorded verification methods, wherein each verification method of the one or more verification methods was performed by the server to successfully verify the user during a time period between a first time and the current local time of the server, and wherein the first time is earlier than the current local time of the server by a predetermined time period;
determining, by the server, whether at least one verification method is included in both the identified one or more verification methods of successful user identity verifications and a list of available verification methods, wherein the list of available verification methods includes a plurality of rows, and each row of the plurality of rows includes at least one available verification method;
determining, by the server, that additional user identity verification is unnecessary if at least one verification method is included in both the identified one or more verification methods of successful user identity verifications and the list of available verification methods; and
using, by the server, one or more available verification methods different from the identified one or more verification methods for user identity verification if no verification method is included in both the identified one or more verification methods of successful user identity verifications and the list of available verification methods.

2. The computer-implemented method of claim 1, wherein the one or more verification methods include at least one of an e-mail verification, text message verification, biometric verification, and security question verification.

3. The computer-implemented method of claim 1, wherein the list of available verification methods is locally stored on the server.

4. The computer-implemented method of claim 1, further comprises:
identifying a verification method included in the identified one or more verification methods of successful user identity verifications that is not included in the list of available verification methods; and
adding the verification method to the list of available verification methods.

5. The computer-implemented method of claim 1, wherein determining whether the at least one verification method is included in both the identified one or more verification methods of successful user identity verifications and the list of available verification methods comprises:
comparing the identified one or more verification methods of successful user identity verifications with the list of available verification methods; and
deleting a verification method from the list of available verification methods if the verification method is included in the identified one or more verification methods.

6. The computer-implemented method of claim 5, wherein the additional user identity verification is unnecessary when a row of the list is deleted after deleting the verification method from the list of available verification methods, and wherein using one or more available verification methods different from the identified one or more verification methods for user identity verification further comprises:
randomly selecting a row from one or more rows after deleting the verification method from the list of available verification methods if the verification method is included in the identified one or more verification methods; and
using each verification method included in the randomly selected row to perform user identity verification.

7. The computer-implemented method of claim 5, wherein the additional user identity verification is unnecessary when a row of the list is deleted after deleting the verification method from the list of available verification methods, and wherein using one or more available verification methods different from the identified one or more verification methods for user identity verification further comprises:
selecting a row from one or more rows that has the least number of verification methods after deleting the verification method from the list of available verification methods if the verification method is included in the identified one or more verification methods; and
using each verification method included in the selected row to perform user identity verification.

8. A non-transitory, computer-readable medium storing one or more instructions executable by a computer system to perform operations comprising:
recording, by a server, times and corresponding verification methods of successful user identity verifications, wherein the server records a time and a corresponding verification method when a user identity verification has been used to successfully verify a user, and the corresponding verification method is one of a plurality of verification methods available for the server to verify the user;
receiving, by the server and from a terminal, a verification request associated with a user operation related to a security property of the user that requires an identity verification of the user;
in response to receiving the verification request, determining, by the server, a current local time of the server when the verification request was received;
identifying, by the server, one or more verification methods of successful user identity verifications from the recorded verification methods, wherein each verification method of the one or more verification methods was performed by the server to successfully verify the user during a time period between a first time and the current local time of the server, and wherein the first time is earlier than the current local time of the server by a predetermined time period;
determining, by the server, whether at least one verification method is included in both the identified one or more verification methods of successful user identity verifications and a list of available verification methods, wherein the list of available verification methods includes a plurality of rows, and each row of the plurality of rows includes at least one available verification method;
  determining, by the server, that additional user identity verification is unnecessary if at least one verification method is included in both the identified one or more verification methods of successful user identity verifications and the list of available verification methods; and
  using, by the server, one or more available verification methods different from the identified one or more verification methods for user identity verification if no verification method is included in both the identified one or more verification methods of successful user identity verifications and the list of available verification methods.

9. The non-transitory, computer-readable medium of claim 8, further comprises:
  identifying a verification method included in the identified one or more verification methods of successful user identity verifications that is not included in the list of available verification methods; and
  adding the verification method to the list of available verification methods.

10. The non-transitory, computer-readable medium of claim 8, wherein determining whether the at least one verification method is included in both the identified one or more verification methods of successful user identity verifications and the list of available verification methods comprises:
  comparing the identified one or more verification methods of successful user identity verifications with the list of available verification methods; and
  deleting a verification method from the list of available verification methods if the verification method is included in the identified one or more verification methods.

11. The non-transitory, computer-readable medium of claim 10, wherein the additional user identity verification is unnecessary when a row of the list is deleted after deleting the verification method from the list of available verification methods, and wherein using one or more available verification methods different from the identified one or more verification methods for user identity verification further comprises:
  randomly selecting a row from one or more rows after deleting the verification method from the list of available verification methods if the verification method is included in the identified one or more verification methods; and
  using each verification method included in the randomly selected row to perform user identity verification.

12. The non-transitory, computer-readable medium of claim 10, wherein the additional user identity verification is unnecessary when a row of the list is deleted after deleting the verification method from the list of available verification methods, and wherein using one or more available verification methods different from the identified one or more verification methods for user identity verification further comprises:
  selecting a row from one or more rows that has the least number of verification methods after deleting the verification method from the list of available verification methods if the verification method is included in the identified one or more verification methods; and
  using each verification method included in the selected row to perform user identity verification.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  recording, by a server, times and corresponding verification methods of successful user identity verifications, wherein the server records a time and a corresponding verification method when a user identity verification has been used to successfully verify a user, and the corresponding verification method is one of a plurality of verification methods available for the server to verify the user;
  receiving, by the server and from a terminal, a verification request associated with a user operation related to a security property of the user that requires an identity verification of the user;
  in response to receiving the verification request, determining, by the server, a current local time of the server when the verification request was received;
  identifying, by the server, one or more verification methods of successful user identity verifications from the recorded verification methods, wherein each verification method of the one or more verification methods was performed by the server to successfully verify the user during a time period between a first time and the current local time of the server, and wherein the first time is earlier than the current local time of the server by a predetermined time period;
  determining, by the server, whether at least one verification method is included in both the identified one or more verification methods of successful user identity verifications and a list of available verification methods, wherein the list of available verification methods includes a plurality of rows, and each row of the plurality of rows includes at least one available verification method;
  determining, by the server, that additional user identity verification is unnecessary if at least one verification method is included in both the identified one or more verification methods of successful user identity verifications and the list of available verification methods; and
  using, by the server, one or more available verification methods different from the identified one or more verification methods for user identity verification if no verification method is included in both the identified one or more verification methods of successful user identity verifications and the list of available verification methods.

14. The computer-implemented system of claim 13, wherein determining whether the at least one verification method is included in both the identified one or more verification methods of successful user identity verifications and the list of available verification methods comprises:
  comparing the identified one or more verification methods of successful user identity verifications with the list of available verification methods; and deleting a verification method from the list of available verification methods if the verification method is included in the identified one or more verification methods.

15. The computer-implemented system of claim 14, wherein the additional user identity verification is unnecessary when a row of the list is deleted after deleting the verification method from the list of available verification methods, and wherein using one or more available verification methods different from the identified one or more verification methods for user identity verification further comprises:

randomly selecting a row from one or more rows after deleting the verification method from the list of available verification methods if the verification method is included in the identified one or more verification methods; and using each verification method included in the randomly selected row to perform user identity verification.

16. The computer-implemented system of claim 14, wherein the additional user identity verification is unnecessary when a row of the list is deleted after deleting the verification method from the list of available verification methods, and wherein using one or more available verification methods different from the identified one or more verification methods for user identity verification further comprises:

selecting a row from one or more rows that has the least number of verification methods after deleting the verification method from the list of available verification methods if the verification method is included in the identified one or more verification methods; and using each verification method included in the selected row to perform user identity verification.

17. A computer-implemented method, comprising:

determining, by a server, a current local time of the server for performing a user identity verification when receiving, from a terminal, a verification request associated with a user operation related to a security property of a user;

determining, by the server, a verification method that fails the user identity verification during a time period between a first time and the current local time of the server, wherein the first time is earlier than the current local time of the server by a predetermined time period, the verification method is one of a plurality of verification methods available for the server to verify the user, and the server has performed the user identity verification and failed to verify the user using the verification method during the time period, and wherein determining the verification method that fails the user identity verification during the time period further includes:

determining a verification method list including a plurality of rows, wherein each row of verification method list comprises at least one verification method;

removing, from the verification method list, a verification method that the user identity verification is successfully performed in the time period; and selecting a verification method from a row of the verification method list after removing the verification method that the user identity verification is successfully performed in the time period; and performing, by the server, the user identity verification using the determined verification method.

18. The computer-implemented method of claim 17, wherein removing, from the verification method list, the verification method that the user identity verification is successfully performed in the time period comprises:

obtaining a mapping relationship between a verification method and a passing time, wherein the passing time is a time the user identity verification is successfully performed in the time period; and removing the verification method from the verification method list if a time difference between a corresponding passing time and the current local time is smaller than the predetermined time period.

19. The computer-implemented method of claim 17, further comprising:

determining whether a number of rows in the verification method list after removing the verification method that the user identity verification is successfully performed in the time period is smaller than the number of rows before the verification method is removed; and determining that the user identity is verified if the number of rows in the verification method list after removing the verification method that the user identity verification is successfully performed in the time period is smaller than the number of rows before the verification method is removed.

* * * * *